United States Patent [19]

Sermon

[11] 4,088,604
[45] May 9, 1978

[54] CATALYST FOR THE DECOMPOSITION OF NITROGEN OXIDES

[75] Inventor: Paul Anthony Sermon, Cowley, England

[73] Assignee: Johnson, Matthey & co., Limited, London, England

[21] Appl. No.: 740,172

[22] Filed: Nov. 9, 1976

Related U.S. Application Data

[63] Continuation of Ser. No. 553,308, Feb. 26, 1975, abandoned.

[30] Foreign Application Priority Data

Mar. 6, 1974 United Kingdom ............... 10063/74

[51] Int. Cl.$^2$ ........................ B01J 21/04; B01J 21/12; B01J 23/74
[52] U.S. Cl. ................................ 252/455 R; 252/457; 252/466 J; 252/472; 423/239
[58] Field of Search ................... 252/432, 447, 455 R, 252/457, 459, 466 J, 470, 472, 473; 423/213.5, 239, 594

[56] References Cited

U.S. PATENT DOCUMENTS

| | | | |
|---|---|---|---|
| 3,773,894 | 11/1973 | Bernstein et al. ................. | 423/213.5 |
| 3,883,444 | 5/1975 | Maselli et al. ...................... | 423/213.5 |
| 3,888,792 | 6/1975 | Hughes ............................. | 252/472 X |
| 3,923,696 | 12/1975 | Chart et al. ......................... | 252/472 |

*Primary Examiner*—W. J. Shine
*Attorney, Agent, or Firm*—Cushman, Darby & Cushman

[57] ABSTRACT

This invention relates to catalysts which may be used in the purification of air and other gaseous media. More particularly, the invention relates to catalysts which may be used in the decomposition of one or more of the oxides of nitrogen comprising a mixed oxide of iron and cobalt selected from the group consisting of (a) $Co_x^{II} Fe_{1-x}^{II} Fe_2^{III} O_4$ where $x$ normally has values of $0 \leq x \leq 1$ and (b) $Co^{II} Co_{(x-1)}^{III} Fe_{(3-x)}^{III} O_4$ where $x$ normally has values $1 \leq x \leq 3$.

4 Claims, 1 Drawing Figure

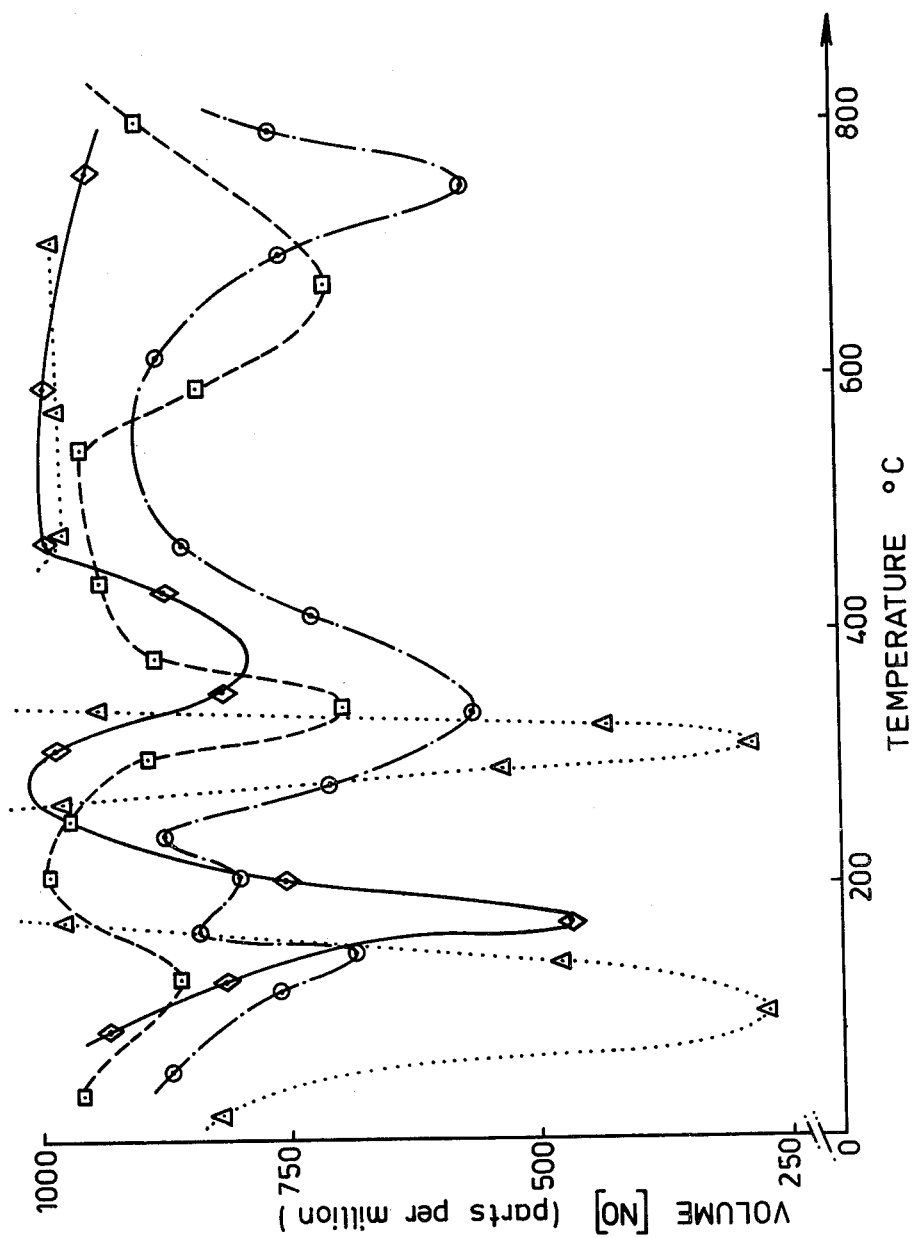

CATALYST FOR THE DECOMPOSITION OF NITROGEN OXIDES

This is a continuation of application Ser. No. 553,308 filed Feb. 26, 1975, now abandoned.

This invention relates to catalysts which may be used in the purification of air and other gaseous media; more particularly it relates to catalysts which may be used in the decomposition of one or more of the oxides of nitrogen.

According to one aspect of the present invention a catalyst material for the decomposition of one or more oxides of nitrogen comprises a mixed oxide of iron and cobalt selected from the group consisting of (a) $Co_x^{II} Fe_{1-x}^{II} Fe_2^{III} O_4$
   where $x$ normally has values $0 \leq x \leq 1$; and
(b) $Co^{II} Co_{(x-1)}^{III} Fe_{(3-x)}^{III} O_4$
   where $x$ normally has values $1 \leq x \leq 3$.

Suitable values of $x$ for type (a) are 0, 0.5 and 1 and for type (b) 1, 2 and 3.

Compositions of the types (a) and (b) are not necessarily stoichiometric compounds and consequently the value of $x$ may vary without greatly altering the structure of properties of the composition.

Dispersions of catalysts according to the present invention may be deposited upon supports by methods well known in the art. For example, an inert unitary porous refractory ceramic honeycomb having a high surface area catalytically active refractory metal oxide coating which may have a dispersion of the catalyst pumped into it and this is followed by drying and calcining. Similar methods may be used for depositing the catalytic compositions on pellets, granules, spherules, powder shaped extrudates, monoliths, corrugated metallic substrates and nichrome wire.

Suitable corrugated or extended metallic substrates which may be used are those disclosed in German DOS No. 2450664.

One particular extended metal substrate suitable for use with a catalyst of the present invention is an oxidation resistant alloy of iron including at least one of the elements (3-40 wt.%) chromium, (1-10 wt.%) aluminium, (a trace to 5 wt.%) cobalt, (a trace to 72 wt.%) nickel and (a trace to 0.5 wt.%) carbon.

Another extended metal substrate is a heat resisting alloy having an aggregate nickel plus chromium content of greater than 20% by weight, the said heat resisting alloy also exhibiting relatively high mechanical strength and thermal conductivity. Where a metal substrate is used as a catalyst support, the substrate has deposited thereon a first layer comprising an adherent coating or film containing oxygen and a second layer containing a mixed oxide of iron and cobalt as defined above. Preferably the mixed oxide of iron and cobalt is present in an amount of at least 10% by weight.

Preferably, the first oxygen-containing layer upon the extended metal substrate is an adherent oxide coating or film containing, for example, one or more of alumina, silica, titania, zirconia, hafnia, thoria, beryllia, magnesia, chromia, or boria but may also comprise oxygen containing anions such as chromate, phosphate, silicate and nitrate.

The second layer comprising one or more of the mixed oxides of iron and cobalt as defined above is deposited upon the oxygen containing coating or film integral with the substrate and may be deposited in a form which possesses catalytic activity or which is capable of being rendered catalytically active by subsequent treatment. Catalytic structures according to this aspect of the present invention are extremely robust and effective in catalysing high temperature reactions such as the decomposition or reduction of nitric oxide.

Alternatively suitable materials which may be used to constitute a ceramic support are zircon-mullite, mullite, alpha alumina, sillimanite, magnesium silicates, kaolin clays, zircon, petalite, spodumene, cordierite and most alumino-silicates.

Proprietary products which may be used are described in U.S. Pat. Nos. 3,397,154 and 3,498,927 and British patent specification No. 882,484. Examples of such products are "TORVEX", a mullite honeycomb having eight corrugations per inch and an alumina washcoat; "THERMACOMB", a cordierite honeycomb supplied by the American Lava Corporation and EX 20 a cordierite honeycomb supplied by Corning Glass.

A surface area of at least 600 sq.ft. per cubic foot of washcoated honeycomb is preferred. A water porosity ranging from 15-40% is suitable with 25% preferred. At least 10% of the micropores should have a diameter greater than 10 microns and 90% greater than 10 microns is preferred.

Preferably, the quantity of mixed oxide of iron and cobalt deposited upon a ceramic honeycomb support is that quantity which gives 10 grams of Fe and Co (as metal) per cubic foot of support.

The present invention also includes a catalytic structure comprising an inert unitary porous refractory ceramic honeycomb having a first or intermediate coating of a high surface area catalytically active refractory metal oxide and a second layer deposited upon the first layer and containing a mixed oxide of iron and cobalt as defined above. Preferably, the mixed oxide of iron and cobalt is present in an amount of at least 10% by weight.

EXAMPLES

A series of mixed oxides as follows:
$Fe^{II} Fe_2^{III} O_4$ (i.e. $x = 0$)
$Co_{\frac{1}{2}}^{II} Fe_{\frac{1}{2}}^{II} Fe_2^{III} O_4$ (i.e. $x = \frac{1}{2}$)
$Co^{II} Fe_2^{III} O_4$ (i.e. $x = 1$, either formula)
$Co^{II} Co^{III} Fe^{III} O_4$ (i.e. $x = 2$) and
$Co^{II} Co_2^{III} O_4$ (i.e. $x = 3$)
were prepared in the unsupported state. Nevertheless they had a surface area of exposure to the reacting gas of greater than 60 square meters per gram.

Data for the catalysed decomposition of nitric oxide was obtained for the above mixed oxides using the following reaction conditions:

A bed depth of 1 cm. and a bed diameter of 0.6 cm. was used. Weight of mixed oxide normally taken: 0.3-0.5g. A reactant gas input of 100 cm$^3$ mm$^{-1}$ was used: 1000 ppm of NO in N$_2$. Space velocity at 600° C was 33,000 hr$^{-1}$.

The activities of the mixed oxides with respect to NO decomposition are shown in FIG. 1.

It can be seen that the majority of peaks observed are associated with an NO adsorption/desorption process. The material where $x = 2$ appears to be the most active catalyst, showing a reasonable NO dissociation peak at just below 400° C.

Similar results to those referred to above have also been obtained where the catalyst material was supported on extended metal substrates of the type herein described.

What we claim is:

1. A catalyst material for the decomposition of one or more oxides of nitrogen comprising a ceramic or metal catalyst substrate having deposited thereon a first layer comprising an adherent oxide coating and having on said first layer a layer of a catalyst consisting essentially of a mixed oxide selected from the group of mixed oxides consisting of $Co_1{}^{II}Fe_1{}^{II}Fe_2{}^{III}O_4$;
$Co^{II}Fe_2{}^{III}O_4$;
$Co^{II}Co^{III}Fe^{III}O_4$;
and
$Co^{II}Co_2{}^{III}O_4$.

2. A catalyst for the decomposition of one or more oxides of nitrogen comprising a support of an inert unitary porous refractory ceramic honeycomb having deposited thereon a first layer of high surface area catalytically active refractory metal oxide and having on said first layer a layer of a catalyst consisting essentially of a mixed oxide selected from the group of mixed oxides consisting of (a) $Co_x{}^{II}Fe_{1-x}{}^{II}Fe_2{}^{III}O_4$
where $x$ is 0, 0.5 or 1 and
(b) $Co^{II}Co_{(x-1)}{}^{III}Fe_{(3-x)}{}^{III}O_4$ where $x$ is 1, 2 or 3.

3. A catalyst according to claim 1, wherein the catalyst material is dispersed within the said first layer of refractory metal oxide.

4. A catalyst according to claim 2, wherein the ceramic support is made from zircon-mullite, mullite, alpha alumina, sillimanite, magnesium silicates, kaolin clays, zircon, petalite, spodumene, cordierite or an alumino-silicate.

* * * * *